United States Patent [19]

Deur

[11] Patent Number: 4,526,963
[45] Date of Patent: Jul. 2, 1985

[54] DIOXAZINE PIGMENTS

[75] Inventor: Michel Deur, Mulhouse, France

[73] Assignee: Sandoz Ltd., Basel, Switzerland

[21] Appl. No.: 437,369

[22] Filed: Oct. 28, 1982

[30] Foreign Application Priority Data

Nov. 2, 1981 [DE] Fed. Rep. of Germany ....... 3143403

[51] Int. Cl.³ .......................................... C07D 498/22
[52] U.S. Cl. .......................................... 544/74; 8/855
[58] Field of Search .......................................... 544/74

[56] References Cited

U.S. PATENT DOCUMENTS

| | | | |
|---|---|---|---|
| 2,026,092 | 12/1935 | Kränzlein et al. | 544/74 |
| 3,912,732 | 10/1975 | Burdeska et al. | 544/74 |
| 4,400,504 | 8/1983 | Harms et al. | 544/74 |
| 4,459,233 | 7/1984 | Fabian et al. | 544/74 X |

OTHER PUBLICATIONS

Venkataraman, The Chemistry of Synthetic Dyes, vol. V, Academic Press, New York, (1971), pp. 419–427.

Primary Examiner—Richard L. Raymond
Attorney, Agent, or Firm—Gerald D. Sharkin; Richard E. Vila; Thomas C. Doyle

[57] ABSTRACT

Disclosed are dioxazine compounds of formula I

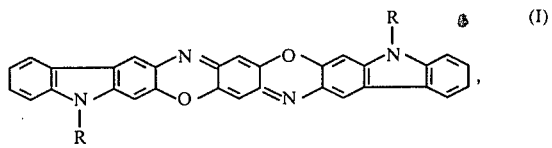

in which each R, independently, is $C_{1-4}$alkyl, their production and use as pigments.

17 Claims, No Drawings

DIOXAZINE PIGMENTS

The present invention relates to dioxazine compounds.

The invention provides dioxazine compounds of formula I

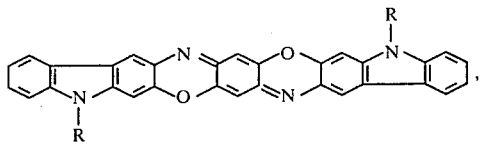

in which each R, independently, is $C_{1-4}$alkyl.

In formula I the $C_{1-4}$alkyl groups as R may be straight-chain or branched. Preferably each R is methyl or ethyl.

Preferred compounds of formula I are those wherein the groups R are identical.

The present invention further provides a process for the production of the dioxazine compounds of formula I comprising cyclising a compound of formula II

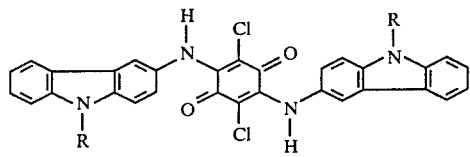

in the presence of an organic acid.

Preferred organic acids include monocarboxylic acids, e.g. acetic acid, propionic acid or benzoic acid, dicarboxylic acids, e.g. oxalic acid, phthalic acid or terephthalic acid, or sulphonic acids e.g. benzenesulphonic acid or toluenesulphonic acid, or mixtures thereof. A particularly preferred acid is p-toluenesulphonic acid.

The cyclisation of compounds of formula II with elimination of two mols of HCl is suitably carried out by heating at a temperature above 160° C. in the presence of an organic acid and in an inert solvent having a boiling point above 160° C. e.g. chlorobenzenes or nitrobenzene. In general, the cyclisation reaction of compounds of formula II leads to a mixture of dioxazine compounds of formula I and chlorinated analogs, i.e. monochlorodioxazine and dichlorodioxazine of formula III

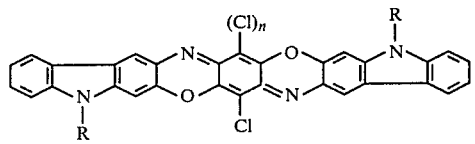

wherein n is 0 or 1.

Preferably the organic acid is used in molar excess; the amount of the final compound of formula I depending on the amount of acid employed. For example, the reaction of 1 mol of a compound of formula II with 1.5 mols of an acid, e.g. p-toluenesulphonic acid, gives a dioxazine mixture which has a chlorine content of 4.5% and contains about 60% of the compound of formula I. When reacting 1 mol of a compound of formula II with 2.5 mols of the same acid, the dioxazine compounds of formula I are obtained with a yield of 75%.

The mixture of compounds of formula I with mono- and dichloro-dioxazines form also part of the invention. The weight ratio of unchlorinated to chlorinated dioxazines may vary within a large range. Suitably the compound or compounds of formula I constitute at least 20%, preferably 40 to 90%, more preferably 50 to 80% by weight, of such a mixture.

The resulting mixture of unchlorinated and chlorinated dioxazines is preferably used as such for technical reasons and since the valuable properties of the dioxazines of formula I as pigments are not negatively affected by the presence of the chlorinated analogs which are also useful as pigments.

The compounds of formula II used as starting materials are known and may be prepared in accordance with known methods from available compounds.

The compounds of formula I, whether in pure form or in form of a mixture with chlorinated dioxazines as stated above, are useful pigments, e.g. for the mass pigmenting of synthetic plastics and resins, free from or containing solvents, e.g. polyvinyl chloride, of surface coatings, such as paints, whether oil or water based, lacquers and inks. They may also be used in pigment printing, textile coating and for pigmenting paper in the mass. They may be employed for such uses in conventional manner and in conventional amounts.

The pigments of formula I have good rheological properties. The pigmentations obtained employing the compounds of formula I possess notably good fastness properties. Furthermore, the coatings and prints obtained with paints, lacquers and inks containing the compounds of formula I are characterized by their brilliance.

After synthesis and before use, the pigments of formula I or the resulting mixture are preferably post-treated according to known methods, e.g. they may be ground in the presence of salt or in a sand or ball mill.

The compounds of formula I may also be sulphonated according to known methods and be used in sulphonated form as direct dyes.

The following Examples illustrate the invention. All temperatures are in degrees Centigrade and parts and percentages are by weight unless stated to the contrary.

EXAMPLE 1

(a) 157.5 g 3-amino-N-ethyl-carbazol and 0.75 g FeCl₃ (powd.) are mixed with 750 ml o-dichlorobenzene and the resulting mixture is heated to 70°. While stirring 24 g 2,3,5,6-tetrachloro-benzoquinone and 16.5 g sodium bicarbonate are added alternately and portionwise, over the course of 5 hours and stirring is continued for a further 2 hour period. The mixture is cooled overnight and about 50 ml o-dichlorobenzene are then distilled off at 80°–85° under reduced pressure. 80 g p-toluene sulphonic acid are added to the mixture and the whole is stirred at 80°–85° for about 15 minutes.

(b) 200 ml o-dichlorobenzene are heated to 180°, the heating being adjusted in such a way that a small amount of o-dichlorobenzene is continuously distilled off, and a light stream of nitrogen is introduced into the reaction flask. The suspension obtained under (a) is added slowly with stirring at a temperature between 175° and 180° to the boiling o-dichlorobenzene. During the addition, about 350 ml o-dichlorobenzene are distilled off. The flask containing the suspension (a) is finally rinsed with 100–150 ml o-dichlorobenzene. For the completion of the reaction, the mixture is further refluxed at 175°–180° for 6 hours. After cooling to 120°, the reaction mixture is saturated with gaseous ammonia. The resulting dioxazine mixture is precipitated, filtered off, successively washed with about 600 ml o-dichlorobenzene heated to 120°, 1250 ml cold methanol and about 1500 ml water and dried in vacuo at 120°. There is obtained a mixture of dioxazines having a 4,5% chlorine content and containing about 60% of the dioxazine of formula

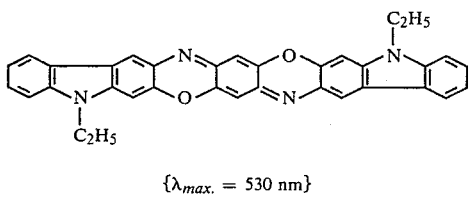

{$\lambda_{max.} = 530$ nm} and 40% of a mixture of the mono- and dichloro-equivalents.

EXAMPLE 2

By following the procedure of Example 1 but using 64 g terephthalic acid instead of p-toluenesulphonic acid, there is obtained a mixture having a 4.0% chlorine content and the same properties as the compound of Example 1.

EXAMPLE 3

By following the procedure of Example 1 but replacing the 157.5 g 3-amino-N-ethyl-carbazol by equimolar amounts of
(a) 3-amino-N-methylcarbazol, or
(b) 3-amino-N-butylcarbazol
a mixture of pigments having the same colouring properties as the compound of Example 1, is obtained.

APPLICATION EXAMPLE A

Four parts of the pigment of Example 1 are added to 96 parts of a mixture of
50 parts of a 60% solution of coco aldehyde-melamine resin of 32% fat content in xylene,
30 parts of a 50% melamine resin solution in butanol,
10 parts of xylene and
10 parts of ethylene glycol monoethylether
and the mixture ground for 24 hours in a ball mill. The dispersion obtained is sprayed on aluminium sheet, the spray coating allowed to dry in the air for 30 minutes and then stoved for 30 minutes at 120°. A violet film with very good light and weathering fastness is obtained.

What is claimed is:

1. A mixture of dioxazine compounds consisting essentially of a compound or mixture of compounds of formula I

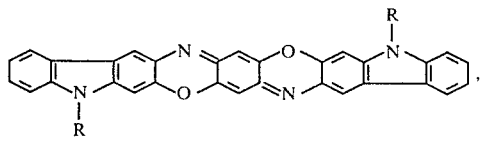

in which each R, independently, is $C_{1-4}$alkyl, in an amount at least 20%, by weight, and a monochloro and a dichloro-dioxazine of formula III

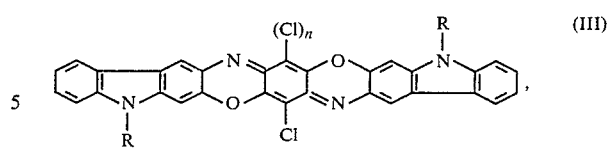

wherein each R is as defined above and n is 0 or 1.

2. A mixture according to claim 1 wherein each R is methyl or ethyl.

3. A mixture according to claim 1 comprising 40 to 90%, by weight, of a compound or mixture of compounds of formula I.

4. A mixture according to claim 3 comprising 50 to 80%, by weight, of a compound or mixture of compounds of formula I.

5. A mixture according to claim 3 consisting essentially of about 60%, by weight, of a compound of formula I in which each R is ethyl and 40% of a mixture of compounds of formula III in which each R is ethyl.

6. A mixture according to claim 3 wherein each R is methyl or ethyl.

7. A process for producing a dioxazine compound of formula I

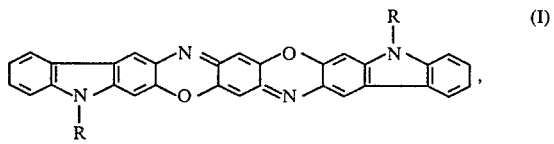

in which each R, independently, is $C_{1-4}$alkyl, which comprises cyclizing a compound of formula II

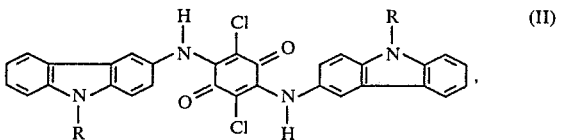

in which each R is as defined above, in the presence of an organic acid.

8. A process according to claim 7 wherein the organic acid is a monocarboxylic acid, a dicarboxylic acid, a sulphonic acid or a mixture thereof.

9. A process according to claim 7, wherein the acid is a sulphonic acid or a mixture thereof.

10. A process according to claim 8 wherein the organic acid is acetic, propionic, benzoic, oxalic, phthalic, terephthalic, benzenesulphonic or toluenesulphonic acid or a mixture thereof.

11. A process according to claim 7 wherein the organic acid is present in a molar excess with respect to the compound of formula II.

12. A process according to claim 8 wherein the organic acid is present in a molar excess with respect to the compound of formula II.

13. A process according to claim 10 wherein the organic acid is present in a molar excess with respect to the compound of formula II.

14. A process according to claim 7 wherein the cyclization is effected at a temperature above 160° C. in an inert solvent having a boiling point above 160° C.

15. A process according to claim 10 wherein the cyclization is effected at a temperature above 160° C. in an inert solvent having a boiling point above 160° C.

16. A process according to claim 11 wherein the cyclization is effected at a temperature above 160° C. in an inert solvent having a boiling point above 160° C.

17. A process according to claim 13 wherein the cyclization is effected at a temperature above 160° C. in an inert solvent having a boiling point above 160° C.

* * * * *